United States Patent [19]

Koizumi

[11] Patent Number: 5,765,110
[45] Date of Patent: Jun. 9, 1998

[54] CELLULAR TELEPHONE WITH WIRE CONNECTION FUNCTION

[75] Inventor: Fumiaki Koizumi, Tokyo, Japan

[73] Assignee: NEC Corporation, Tokyo, Japan

[21] Appl. No.: 923,849

[22] Filed: Sep. 4, 1997

Related U.S. Application Data

[63] Continuation of Ser. No. 494,411, Jun. 26, 1995, abandoned.

[30] Foreign Application Priority Data

Jun. 27, 1994 [JP] Japan ................. 6-144943

[51] Int. Cl.$^6$ ................. H04M 11/00; H04Q 7/00
[52] U.S. Cl. ................. 455/445; 455/417; 375/220
[58] Field of Search ................. 455/417, 445, 455/557, 553, 461; 375/216, 220, 222; 395/1

[56] References Cited

U.S. PATENT DOCUMENTS

| | | |
|---|---|---|
| 4,538,029 | 8/1985 | Gazzoli et al. . |
| 4,658,416 | 4/1987 | Tanaka ................. 455/445 X |
| 4,691,338 | 9/1987 | Makino . |
| 4,972,457 | 11/1990 | O'Sullivan ................. 379/61 X |
| 5,054,042 | 10/1991 | Soury et al. ................. 455/445 X |
| 5,127,042 | 6/1992 | Gillig et al. ................. 379/61 X |
| 5,260,988 | 11/1993 | Schellinger et al. ................. 379/59 |
| 5,375,161 | 12/1994 | Fuller et al. ................. 455/445 X |
| 5,390,233 | 2/1995 | Jensen et al. ................. 455/417 |
| 5,406,615 | 4/1995 | Miller, II et al. ................. 455/33.1 X |
| 5,463,674 | 10/1995 | Gillig et al. ................. 379/59 |
| 5,504,802 | 4/1996 | Kennedy et al. ................. 375/222 X |
| 5,506,887 | 4/1996 | Emery et al. ................. 455/54.1 X |
| 5,513,248 | 4/1996 | Evans et al. ................. 379/61 |
| 5,526,403 | 6/1996 | Tam ................. 379/59 |
| 5,544,227 | 8/1996 | Blust et al. ................. 455/445 X |
| 5,594,782 | 1/1997 | Zicker et al. ................. 379/63 |

FOREIGN PATENT DOCUMENTS

| | | |
|---|---|---|
| 0 284 324 | 9/1988 | European Pat. Off. . |
| 4-126418 | 4/1992 | Japan . |

*Primary Examiner*—David R. Hudspeth
*Assistant Examiner*—Scott Richardson
*Attorney, Agent, or Firm*—Scully, Scott, Murphy and Presser

[57] ABSTRACT

A cellular telephone with a wire connection function has a unique telephone number assigned thereto and has a function of performing a wire speech communication upon connection to a wire telephone line to which another telephone number is assigned. The cellular telephone includes a connection section and a selection section. When an incoming call is received while the wire telephone line is connected to the cellular telephone, the connection section generates an outgoing call to a different terminal having a different telephone number, by using a radio channel or the wire line which is available, to establish a speech communication, and connecting the incoming call to the different terminal. The selection section selects whether to enable or disable the connection section. The call terminated to the cellular telephone can be connected to another designated terminal.

3 Claims, 4 Drawing Sheets

CELLULAR TELEPHONE WITH WIRE CONNECTION FUNCTION

This application is a continuation of application Ser. No. 08/494,411, filed Jun. 26, 1995, now abandoned.

BACKGROUND OF THE INVENTION

1. Field of the Invention

The present invention relates to a cellular telephone with a wire connection function and, more particularly, to a method of controlling a cellular telephone with a wire connection function.

2. Description of the Prior Art

A conventional cellular telephone with a wire connection function of this type aims at avoiding an uneconomical radio speech communication in an indoor operation and perform wire connection instead so as to perform an economical wire speech communication, as disclosed in, e.g., Japanese Unexamined Patent Publication No. 4-126418.

FIG. 1 is a block diagram showing a schematic arrangement of a conventional cellular telephone with a wire connection function. Both the circuit arrangement and operation of this cellular telephone will be described. When the cellular telephone with the wire connection function is used on the reception side, a signal wave corresponding to a telephone number is transmitted from a radio base station. An antenna 7 receives this wave and outputs it to a radio section 6. The radio section 6 demodulates the received radio signal and supplies it to a telephone control section 3. The telephone control section 3 checks whether the number obtained by demodulation coincides with the telephone number of the home telephone. If the number coincides with the telephone number of the home telephone, the telephone control section 3 determines that the incoming call is a call for the home telephone. The telephone control section 3 then causes a speaker section 1 to generate a ringing tone. The user recognizes the call with this ringing tone, and operates the hook switch to set a speech communication enabled state (off-hook state). Subsequently, the radio section 6 demodulates a speech signal and outputs the resultant signal to the speaker section 1 via the telephone control section 3 to drive the speaker section 1. The voice of the user is converted into a speech signal by a microphone section 2. The speech signal is modulated by the radio section 6 via the telephone control section 3. The resultant signal is then transmitted from the antenna 7 to the radio base station.

When this cellular telephone with the wire connection function is used on the transmission side, the user operates the hook switch (not shown), and operates the ten-key pad of an operation section 5 to input the telephone number of a callee. The telephone control section 3 then receives this telephone number and performs a dial originating operation. This originating signal is transmitted to the radio base station via the radio section 6 and the antenna 7.

Assume that this cellular telephone with the wire connection function is carried indoors, and a plug portion 11b connected to a telephone line is connected to a plug portion 11a. In this case, the cellular telephone can receive both calls by wire and radio in the reception mode, and can perform only transmission by wire (telephone line) in the transmission mode.

When this cellular telephone with the wire connection function is used on the reception side, the cellular telephone functions in the same manner as a general wire telephone. That is, an overvoltage protection circuit 9 protects the cellular telephone with the wire connection function against an overvoltage input through a telephone line. The telephone control section 3 separates a speech signal sent through the line and outputs it to the speaker section 1. Also, the telephone control section 3 outputs a speech signal from the microphone section 2 to the line. A circuit control section 8 detects a terminating signal sent through the line. Upon detection of a terminating signal, the circuit control section 8 informs the telephone control section 3 of this detection. The telephone control section 3 then causes the speaker section 1 to generate a ringing tone.

When this cellular telephone with the wire connection function is used on the transmission side, the cellular telephone also performs the same operation as that of a general wire telephone. That is, when the user operates the ten-key pad of the operation section 5 to input the telephone number of a callee, the telephone control section 3 receives it and drives the circuit control section 8. The circuit control section 8 performs a dial originating operation through the line. After the callee responds to the call, a speech communication can be performed, as usual. Reference numeral 4a denotes an LED.

In this conventional cellular telephone with the wire connection function, when wire connection is performed, two systems based on a telephone line and a telephone channel, i.e., wire and radio systems, are ensured. However, no attempts have been made to control the two systems at once. That is, such an excellent environment is not effectively used at present.

The conventional cellular telephone with the wire connection function aims at an economical speech communication in an indoor operation. In addition, this cellular telephone is recommended for effective use of itself (by eliminating a disabled state). From the viewpoint of this effective use as well, it is not efficient to perform control for the use of only one system based on a telephone line/channel at once in the conventional cellular telephone with the wire connection function.

SUMMARY OF THE INVENTION

The present invention has been made in consideration of the above situation, and has as its object to provide a cellular telephone with a wire connection function which can ensure both a wire telephone line and a radio telephone channel and can effectively control and use these telephone line and channel in terms of charge and function when the wire telephone line and the cellular telephone are connected to each other.

In order to achieve the above object, according to the first aspect of the present invention, there is provided a cellular telephone with a wire connection function which has a unique telephone number assigned thereto and has a function of performing a wire speech communication upon connection to a wire telephone line to which another telephone number is assigned, comprising connection means for, when an incoming call is received while the wire telephone line is connected to the cellular telephone, generating an outgoing call to a different terminal having a different telephone number, by using one of a radio channel and the wire line which is available, to establish a speech communication, and connecting the incoming call to the different terminal, and means for selecting whether to enable or disable the connection means, wherein the call terminated to the cellular telephone can be connected to another designated terminal.

In addition, according to the second aspect of the present invention, there is provided a cellular telephone with a wire connection function which has a unique telephone number assigned thereto and has a function of performing a wire speech communication upon connection to a wire telephone line to which another telephone number is assigned, comprising connection means for, when outgoing calls are to be generated while the wire telephone line is connected to the cellular telephone, generating outgoing calls to terminals having different telephone numbers, by using both the wire telephone line and a radio telephone channel of the cellular telephone, to simultaneously establish speech communications through both the wire line and the radio channel, and means for selecting whether to enable or disable the connection means, wherein speech communications among three terminals can be simultaneously performed.

Furthermore, according to the third aspect of the present invention, there is provided a cellular telephone with a wire connection function which has a unique telephone number assigned thereto and has a function of performing a wire speech communication upon connection to a wire telephone line to which another telephone number is assigned, comprising first connection means for, when an incoming call is received while the wire telephone line is connected to the cellular telephone, generating an outgoing call to a different terminal having a different telephone number, by using one of a radio channel and the wire line which is available, to establish a speech communication, and connecting the incoming call to the different terminal, second connection means for, when outgoing calls are to be generated while the wire telephone line is connected to the cellular telephone, generating outgoing calls to terminals having different telephone numbers, by using both the wire telephone line and a radio telephone channel of the cellular telephone, to simultaneously establish speech communications through both the wire line and the radio channel, and means for selecting whether to enable or disable the first and second connection means.

According to the cellular telephone with the wire connection function of the present invention, when an incoming call is received while a wire telephone line is connected to the cellular telephone, an outgoing call is generated to a different terminal having a different telephone number, by using a radio channel or the wire line which is available, to establish a speech communication, and the incoming call is connected to the different terminal. With this function, both the wire line and the radio channel can be efficiency and economically used. If, for example, the cellular telephone of the present invention is installed in the user's home, a telephone call which is made to the home while the user is out can be connected to a terminal designated by the user (e.g., a telephone in a place where the use is visiting).

In addition, when outgoing calls are to be generated while the wire telephone line is connected to the cellular telephone with the wire connection function, outgoing calls are generated to terminals having different telephone numbers, by using both the wire telephone line and the radio telephone channel, to simultaneously establish speech communications through both the wire line and the radio channels. With this function, both the wire line and the radio channel can be efficiently used. In addition, simultaneous speech communications among three people can be realized by using both the wire line and the radio channel which are simultaneously established. Therefore, telephone conference can also be performed by using this cellular telephone.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF THE PREFERRED EMBODIMENT

A preferred embodiment of the present invention will be described below with reference to the accompanying drawings.

Figure 1:
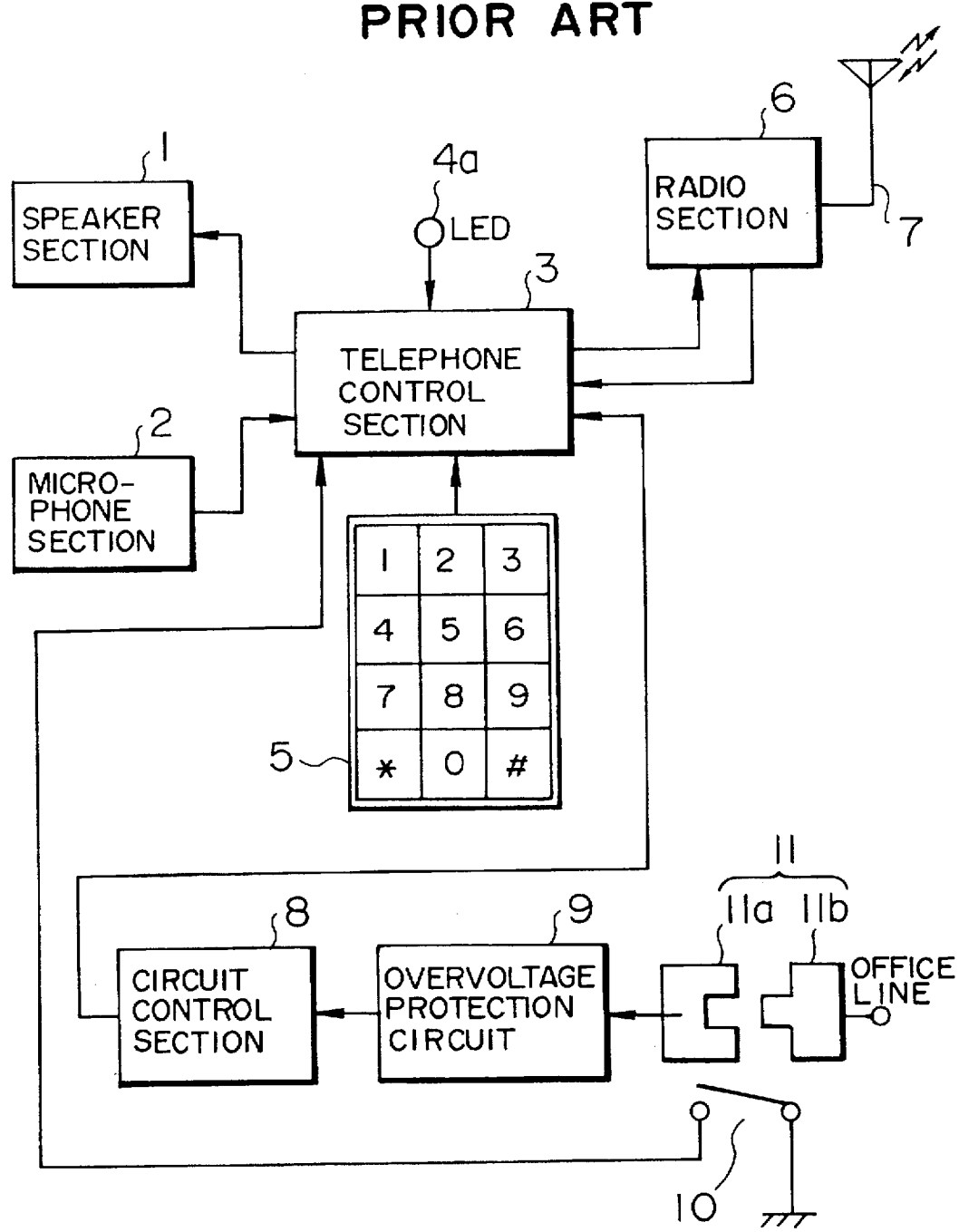
FIG. 1 is a block diagram showing a schematic arrangement of a conventional cellular telephone.
Figure 2:
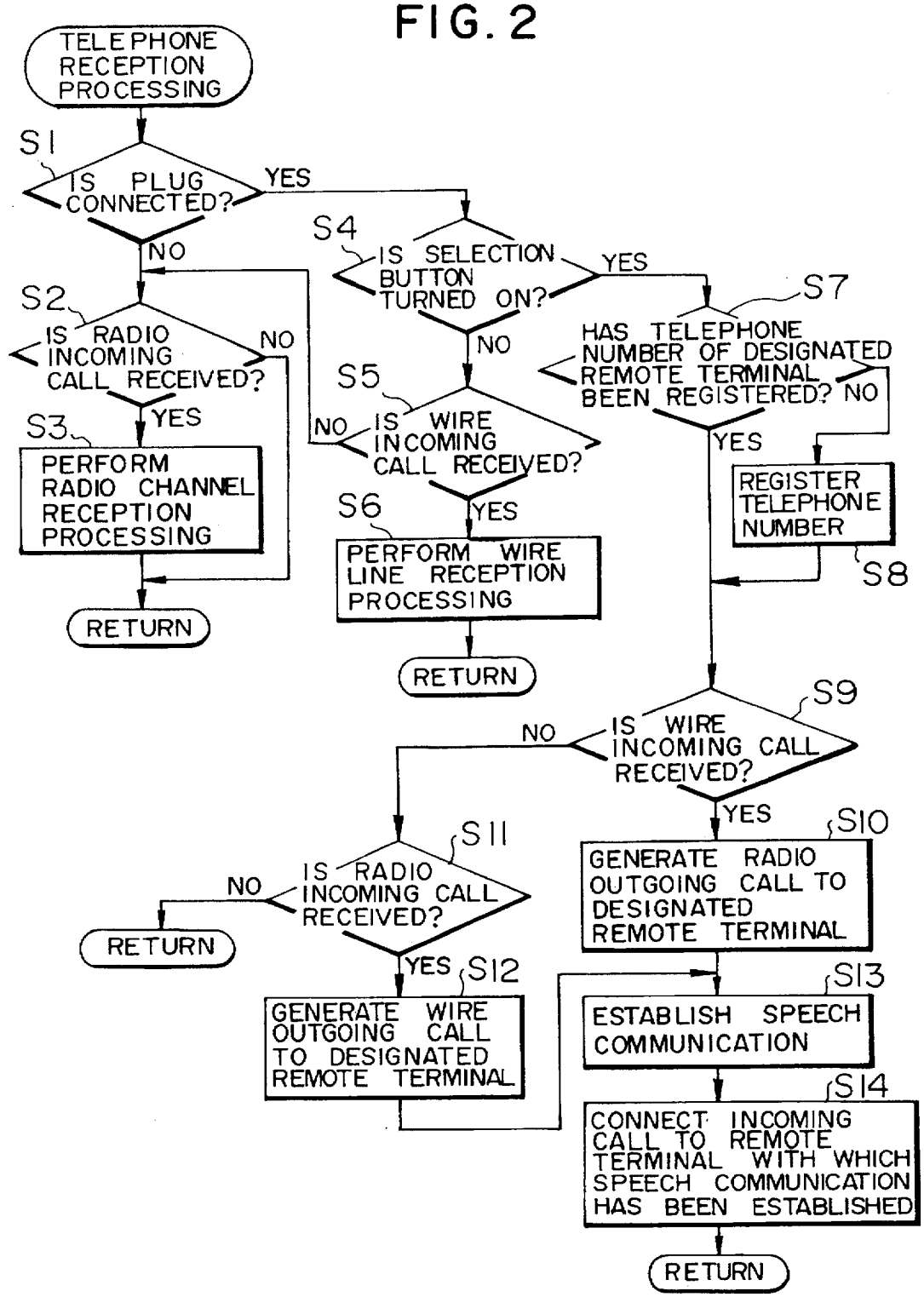
FIG. 2 is a flow chart showing the operation of an embodiment of the present invention in the reception mode.
Figure 3:
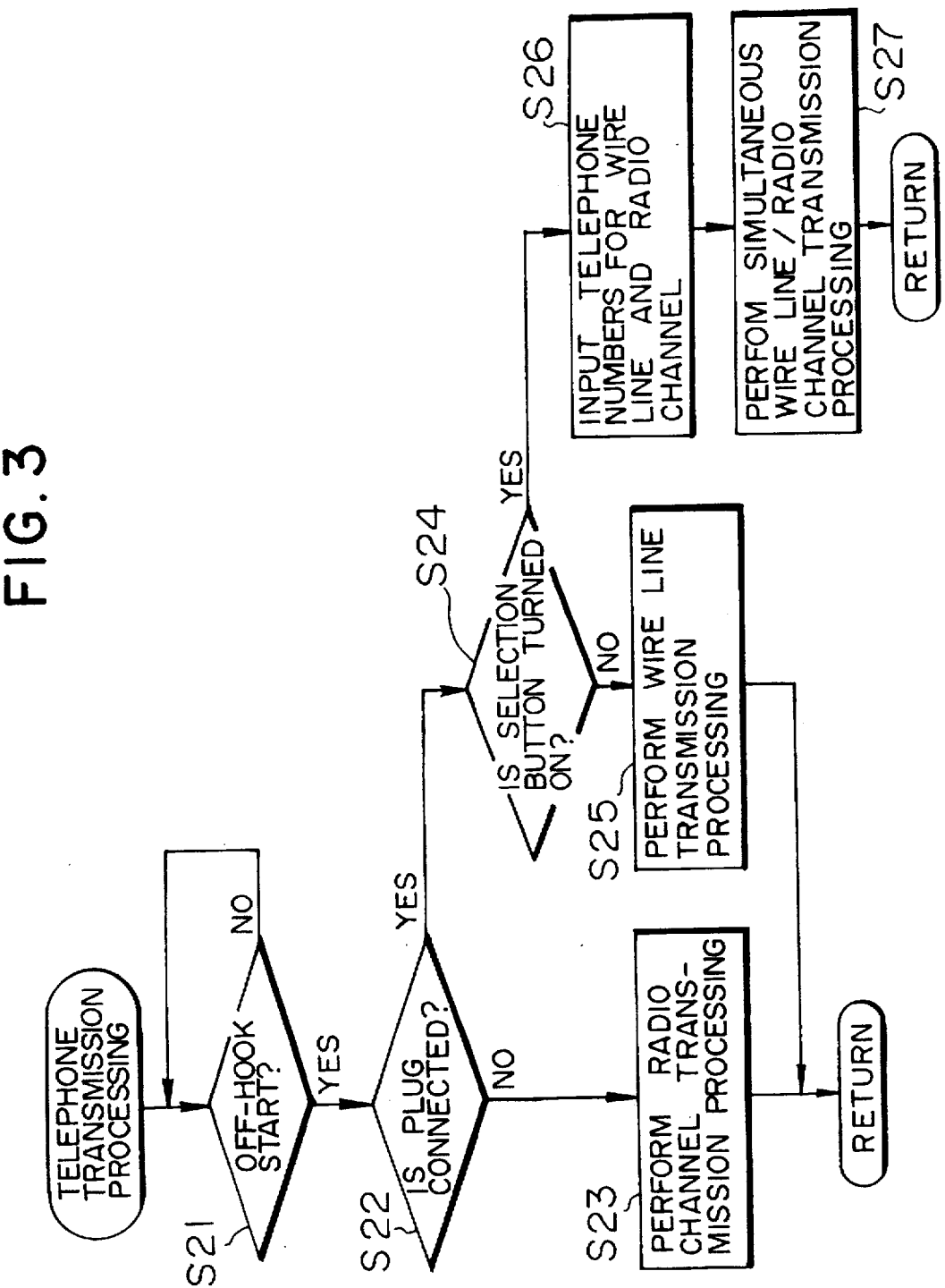
FIG. 3 is a flow chart showing the operation of the embodiment of the present invention in the transmission mode.
Figure 4:
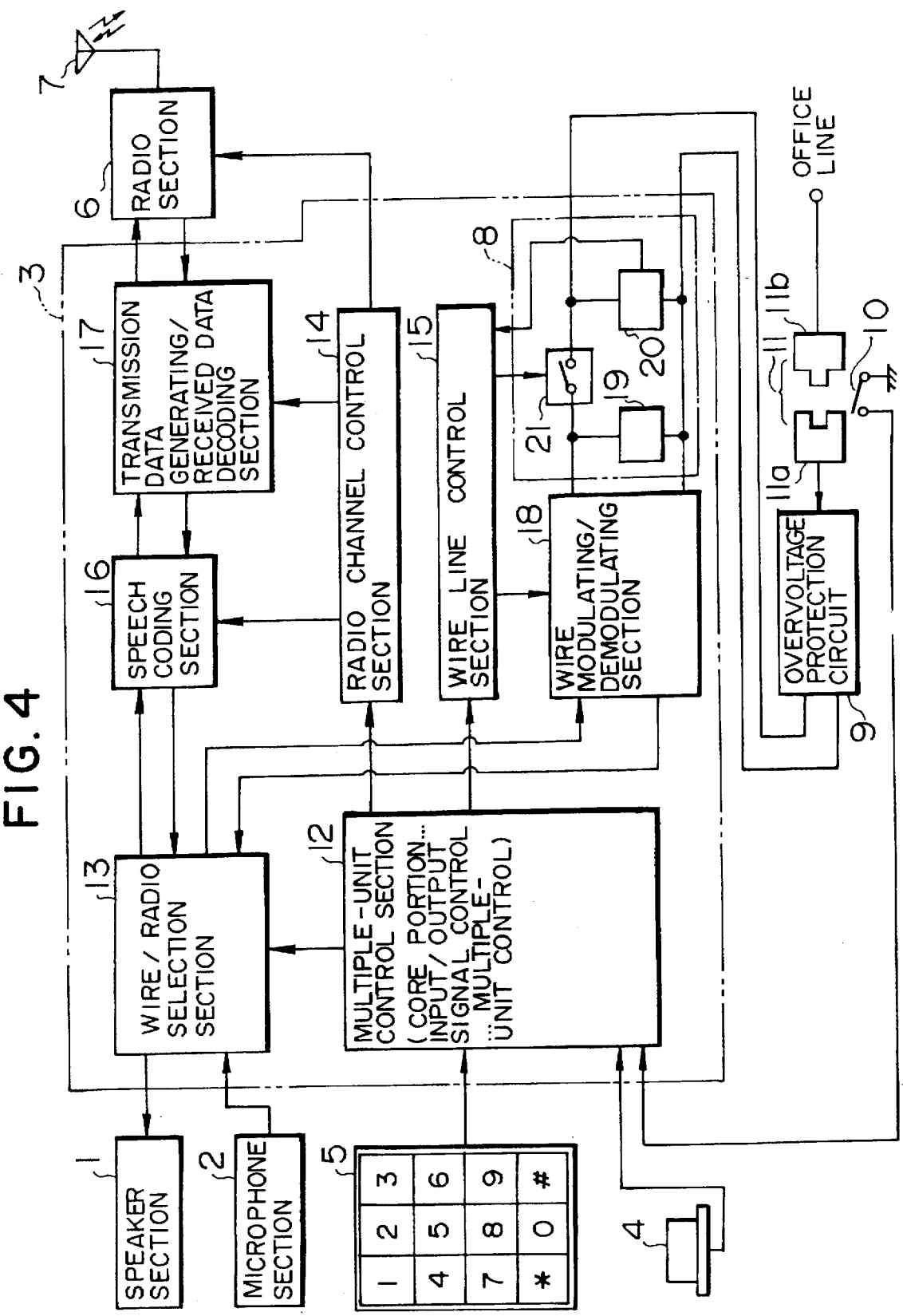
FIG. 4 is a block diagram showing a schematic arrangement of the embodiment of the present invention.

FIGS. 2 and 3 are flow charts showing the operation of the embodiment of the present invention. FIG. 2 shows the operation of the embodiment in a standby state (terminating operation). FIG. 3 shows the operation of the embodiment in an originating operation. FIG. 4 is a block diagram showing the arrangement of the embodiment.

Referring to FIG. 4, a selection button 4 is connected to a multiple-unit control section 12 of a telephone control section 3. The control shown in FIGS. 2 and 3 is performed upon detection of the ON/OFF state of this selection button 4. The telephone control section 3 is connected to a speaker section 1 and a microphone section 2 via a wire/radio selection section 13. The speaker section 1 reproduces a signal from the wire/radio selection section 13 into speech. The microphone section 2 supplies an external sound as a signal to the wire/radio selection section 13. The operation section 5 supplies operation information to the multiple-unit control section 12.

An antenna 7 is connected to a radio section 6. The radio section 6 is connected to a transmission data generating/received data decoding section 17. The radio section 6 exchanges radio speech communications via a radio channel control section 14 upon reception of instructions from the multiple-unit control section 12. The transmission data generating/received data decoding section 17 constructs a data structure called a frame as a data block to modulate a coded signal into transmission data.

A plug 11a of a wire line connection section 11 is connected to an overvoltage protection circuit 9. The overvoltage protection circuit 9 is connected to a circuit control section 8 of the telephone control section 3. This cellular telephone includes a line connection switch 10 for detecting connection between a plug 11b on the office line side (wire exchange side) and the plug 11a. The corresponding information is sent to the multiple-unit control section 12 of the telephone control section 3.

The circuit control section 8 includes a selection signal output section 19, a ringing tone detection section 20 connected to a wire line control section 15 which operates upon reception of an instruction from the multiple-unit control section 12, and a wire line off-hook switch 21 which operates in accordance with a signal from the wire line control section 15.

In addition, the telephone control section 3 includes a speech coding section 16, in which an input speech signal is coded for the purposes of error correction, data compression, and the like.

The operation of this embodiment will be described next with reference to the flow charts of FIGS. 2 and 3.

1. Terminating Operation

A terminating operation will be described first with reference to FIG. 2. First of all, it is checked whether the plug 11a is connected (step S1). If the plug 11a is not connected to the plug 11b, it is checked whether a radio incoming call is received (step S2). In this determination processing, when the radio section 6 receives a terminating signal, the telephone control section 3 determines that a radio incoming call is received.

If a radio incoming call is received, radio channel reception processing is performed (step S3). Radio channel reception processing will be described. This cellular telephone serves as a general cellular telephone and performs reception processing. In this case, when a wave from a base station is received by the antenna 7, and the signal demodulated by the radio section 6 coincides with the call telephone number of the home station, a ringing tone is generated by using the speaker section 1. When the user operates the hook switch (not shown) of the cellular telephone, a speech communication enabled state is set to perform a speech communication. When the radio channel reception processing is completed, or no radio incoming call is determined in step S2, the flow returns to step S1.

If it is determined in step S1 that the plug 11a is connected to the plug 11b, it is checked whether the selection button 4 is turned on/off (step S4).

If this selection button 4 is not selected, i.e., not on, it is checked whether a wire incoming call is received (step S5). In this determination processing, when the circuit control section 8 detects a terminating signal, the telephone control section 3 determines that a wire incoming call is received.

If a wire incoming call is received, wire line reception processing is performed (step S6). Wire line reception processing will be described. The cellular telephone serves as a wire telephone and performs reception processing. In this case, the circuit control section 8 detects a terminating signal sent through a line. Upon detection of a terminating signal, the circuit control section 8 notifies the telephone control section 3 of the corresponding information. The telephone control section 3 causes the speaker section 1 to generate a ringing tone. When the user operates the hook switch (not shown), a speech communication enabled state is set to perform a speech communication. When the wire line reception processing is completed, the flow returns to step S1.

If it is determined in step S5 that no wire incoming call is received, the flow advances to step S2 to check whether a radio incoming call is received. Subsequently, the above processing in step S3 is performed, or the flow returns to step S1.

If it is determined in step S4 that the selection button 4 is turned on, in contrast to the above determination, simultaneous wire line/radio channel processing is started (starting from step S7). In this processing, when an incoming call is received, an outgoing call is generated by using an available line/channel. When, for example, an incoming call is received through a wire telephone line, an outgoing call is generated to a remote terminal having a designated telephone number by using a radio telephone channel to establish a speech communication. Thereafter, the wire incoming call is connected to the terminal having the designated telephone number.

One practical example based on the above processing function will be described below. Assume that the user of the cellular telephone has made a business trip to a given office where a wire telephone is installed. Also assume that someone who does not know the telephone number of the cellular telephone has made a wire telephone call to the user's home. In this case, as is apparent, the user cannot answer the wire telephone call. If, however, the telephone in the user's home is the cellular telephone with the wire connection function of the present invention, the wire telephone call which has been made to the user's home can be connected, via a radio telephone channel of the cellular telephone, to the wire telephone in the office where the user is present.

This processing will be described in accordance with the following steps. It is checked whether the designated telephone number is registered (step S7). If the telephone number is not registered or is to be changed, a registering operation is performed (step S8). If a wire incoming call is received at this time, the above outgoing call is generated by using the radio telephone channel (step S10). If a radio incoming call is received, the above outgoing call is generated by using the wire line (step S12). If no incoming call is received through neither a wire line nor a radio channel, the flow returns to step S1. If the plug-connected state or the state of the selection button is not changed, a standby state in the above simultaneous processing is kept. A speech communication is established (step S13) by the originating operation performed in step S10 or S12, and the above incoming call is connected to the terminal having the designated telephone number (step S14). Subsequently, when an on-hook signal is output from the terminal which has given the incoming call to the cellular telephone with the wire connection function or from the terminal which has the designated telephone number, the processing is completed, and the flow returns to step S1.

When an incoming call is received through one of a wire line and a radio channel, the call is connected to the other line/channel. This connecting operation will be described below. Assume that the cellular telephone in a standby state has undergone position registration with respect to a radio base station, and has been monitoring a call signal through the wire line.

(1) Operation to be performed when an incoming call is received through a wire line:

When an incoming call is received through a wire line in a standby state in which the selection button 4 is on, the cellular telephone generates an originating call with respect to a preset telephone number by using a radio channel. Assume that the cellular telephone keeps returning a ring back tone to the person who is calling by wire until, for example, a response signal indicating that the callee has answered the telephone is received through an exchange (radio base station). When a response is made on the radio channel side, the cellular telephone returns a response signal to the wire line side. As described above, only when the selection button 4 is turned on, a response signal is automatically output from the selection signal output section 19 in response to a call signal through the wire line after the radio channel is established. With this operation, the line between the exchange on the wire line side and the cellular telephone is established. In other words, when the selection button 4 is off, a ringing tone is generated instead of an automatic answering signal in response to an outgoing call. In this manner, both the wire line and the radio channel can be established.

(2) Operation to be performed when an incoming call is received through a radio channel:

In this case, the basically same processing as that in case (1) is performed. More specifically, when an incoming call is received through a radio channel in a standby state in which the selection button 4 is on, the cellular telephone generates an outgoing call with respect to a preset telephone number by using a wire line. Assume that the cellular telephone keeps returning a ring back tone to the person who is calling by radio until, for example, a response signal indicating that the callee has answered the telephone is received through an exchange on the wire line side. When a response is made on the wire line side, the cellular telephone returns a response signal to the radio channel side. In this manner, both the radio channel and the wire line can be established.

(3) Operation to be performed during speech communication after common establishment of a wire line and a radio channel:

Assume that some inquiry is made (some speech data is input) from a radio channel side after common establishment of a wire line and a radio channel. In this case, the corresponding data is demodulated and decoded into a speech signal. This signal is supplied to a wire modulating/demodulating section 18 upon switching of the wire/radio selection section 13. In this section 18, the signal is modulated into wire transmission data. When this data is output to the wire line together with a proper line control signal, a speech communication can be realized.

When an inquiry is made from the wire line side, the reverse processing to that described above is performed. More specifically, the wire modulating/demodulating section 18 extracts a speech signal from the data input through the wire line. This signal is selected by the wire/radio selection section 13 to be supplied to the speech coding section 16 upon switching of the wire/radio selection section 13. The subsequent operation is the same as that of a general cellular telephone. The coded signal is modulated as transmission data by the transmission data generating/received data decoding section 17. The output from this section 17 is sent to the radio section 6. The output from the radio section 6 is modulated and amplified by a radio channel transmission section (not shown). The resultant signal is then transmitted to the radio base station. With this operation, a speech communication is realized.

2. Transmitting Operation

A transmitting operation will be described next with reference to FIG. 3. First of all, it is checked whether the cellular telephone is in an off-hook state (step S21). If the cellular telephone is not in an off-hook state (the hook switch (not shown) is not operated), no telephone transmission processing (originating operation) is performed. If the hook switch (not shown) is operated, and the cellular telephone is in an off-hook state, it is checked whether the plug 11a is connected to the plug 11b (step S22).

If the plug 11a is not connected to the plug 11b, radio channel transmission processing is performed. That is, an originating call is generated by using a radio telephone channel to perform a speech communication. This radio channel transmission processing will be described. When the user operates the ten-key pad of the operation section 5 to input the telephone number of a remote terminal, the telephone control section 3 receives and performs a dial originating operation. This originating signal is transmitted to the radio base station via the radio section 6 and the antenna 7. With this operation, the callee is called, and a speech communication is established (step S23). When this processing is completed, the flow returns to step S21.

If it is determined in step S22 that the plug 11a is connected to the plug 11b, it is checked whether the selection button 4 is turned on/off (step S24).

If this selection button 4 is not turned on, wire line transmission processing is performed. That is, an outgoing call is generated by using a wire line to perform a speech communication. This wire line transmission processing will be described. When the user operates the ten-key pad of the operation section 5 to input the telephone number of a remote terminal, the telephone control section 3 receives the telephone number and drives the circuit control section 8. The circuit control section 8 performs a dial originating operation through the wire line. After the callee responds to this call, a speech communication is performed (step S25). When this processing is completed, the flow returns to step S21.

If it is determined in step S24 that the selection button 4 is turned on, simultaneous wire line/radio channel originating processing is started (starting from step S26).

First of all, the user operates the ten-key pad of the operation section 5 to input the telephone number of a terminal to which a speech communication is to be performed through a wire telephone line, and the telephone number of a terminal to which a speech communication is to be performed through a radio telephone channel (step S26). Originating calls corresponding to the respective telephone numbers are generated to call the callees. After the respective callees respond to these calls, two speech communications based on the cellular telephone with the wire connection function of the present invention are simultaneously established (step S27). When an on-hook signal is output from the callee or the cellular telephone with the wire connection function of the present invention, the control in step S27 is completed, and the flow returns to step S21.

What is claimed is:

1. A cellular telephone with a wire connection function which has a unique telephone number assigned thereto and has a function of performing a wire speech communication upon connection to a wire telephone line to which another telephone number is assigned, comprising:

connection means for, when an incoming call is received while the wire telephone line is connected to said cellular telephone, generating an outgoing call to a different terminal having a different telephone number, which is different from said unique telephone number assigned to said cellular telephone and different from said another telephone number assigned to said wire telephone, by using one of a radio channel and the wire line which is available, to establish a speech communication, and connecting the incoming call to the different terminal without using a call forwarding feature of a telephone network; and means for selecting whether to enable or disable said connection means, wherein the call terminated to said cellular telephone can be connected to another designated terminal.

2. A cellular telephone with a wire connection function which has a unique telephone number assigned thereto and has a function of performing a wire speech communication upon connection to a wire telephone line to which another telephone number is assigned, comprising:

connection means for, when outgoing calls are to be generated while the wire telephone line is connected to said cellular telephone, generating outgoing calls to terminals having different telephone numbers, which are different from said unique telephone number assigned to said cellular telephone and different from said another telephone number assigned to said wire telephone, by using both the wire telephone line and a radio telephone channel of said cellular telephone, to simultaneously establish speech communications through both the wire line and the radio channel without using a call conferencing feature of a telephone network; and means for selecting whether to enable or disable said connection means, wherein speech communications among three terminals can be simultaneously performed.

3. A cellular telephone with a wire connection function which has a unique telephone number assigned thereto and has a function of performing a wire speech communication upon connection to a wire telephone line to which another telephone number is assigned, comprising:

first connection means for, when an incoming call is received while the wire telephone line is connected to said cellular telephone, generating an outgoing call to a different terminal having a different telephone number, which is different from said unique telephone number assigned to said cellular telephone and different from said another telephone number assigned to said wire telephone, by using one of a radio channel and the wire line which is available, to establish a speech communication, and connecting the incoming call to the different terminal without using a call forwarding feature of a telephone network;

second connection means for, when outgoing calls are to be generated while the wire telephone line is connected to said cellular telephone, generating outgoing calls to terminals having different telephone numbers, by using both the wire telephone line and a radio telephone channel of said cellular telephone, to simultaneously establish speech communications through both the wire line ans the radio channel without using a call conferencing feature of the telephone network; and means for selecting whether to enable or disable said first and second connection means.

* * * * *